(12) United States Patent
Lee et al.

(10) Patent No.: US 9,141,607 B1
(45) Date of Patent: Sep. 22, 2015

(54) DETERMINING OPTICAL CHARACTER RECOGNITION PARAMETERS

(75) Inventors: Dar-Shyang Lee, Union City, CA (US); Igor Krivokon, Belmont, CA (US); Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1935 days.

(21) Appl. No.: 11/755,679

(22) Filed: May 30, 2007

(51) Int. Cl.
*G06K 9/46* (2006.01)
*G06F 17/28* (2006.01)
*G06K 9/68* (2006.01)

(52) U.S. Cl.
CPC ............ *G06F 17/289* (2013.01); *G06K 9/6842* (2013.01)

(58) Field of Classification Search
CPC ... G06F 17/275; G06F 17/277; G06F 17/289; G06K 2209/01; G06K 9/6821; G06K 9/6842; G06K 9/723; G06N 99/005
USPC ......................................... 382/185, 312, 321
See application file for complete search history.

(56) References Cited

U.S. PATENT DOCUMENTS

| | | | | |
|---|---|---|---|---|
| 5,377,280 A * | 12/1994 | Nakayama | .................... | 382/229 |
| 5,425,110 A * | 6/1995 | Spitz | .............................. | 382/192 |
| 5,933,525 A * | 8/1999 | Makhoul et al. | .............. | 382/186 |
| 6,047,251 A * | 4/2000 | Pon et al. | .......................... | 704/1 |
| 6,157,905 A * | 12/2000 | Powell | .............................. | 704/2 |
| 6,567,547 B1* | 5/2003 | Roman | .......................... | 382/181 |
| 2007/0112701 A1* | 5/2007 | Chellapilla et al. | ............. | 706/15 |
| 2007/0172125 A1* | 7/2007 | Walch | ........................... | 382/186 |
| 2008/0025610 A1* | 1/2008 | Abdulkader | .................. | 382/185 |

* cited by examiner

*Primary Examiner* — Kim Vu
*Assistant Examiner* — Michael Vanchy, Jr.
(74) *Attorney, Agent, or Firm* — Fish & Richardson P.C.

(57) ABSTRACT

Various aspects can be implemented for determining optical character recognition (OCR) parameters using an OCR engine. In general, one aspect can be a method that includes using an optical character recognition (OCR) engine in a base configuration to generate one or more OCR responses corresponding to one or more sample pages of a document. The method also includes identifying a dominant OCR parameter for the document based on the one or more generated OCR responses. Other implementations of this aspect include corresponding systems, apparatus, and computer program products.

32 Claims, 7 Drawing Sheets

DETERMINING OPTICAL CHARACTER RECOGNITION PARAMETERS

TECHNICAL FIELD

This disclosure generally relates to determining optical character recognition (OCR) parameters (e.g., language and character set) for a document using an OCR engine.

BACKGROUND

Various projects, such as the Google Books Library Project, are underway to create a comprehensive, searchable, electronic card catalog of all documents (e.g., books) in all languages that helps users discover new books and publishers discover new readers. Optical character recognition (OCR) of printed books, or manuscripts can be used to convert books in print format into electronic format. Once the text of the books are scanned and recognized through the OCR operation, it can be easier for people to find relevant books through web searches. The correct OCR parameter configuration can be important in achieving an efficient and accurate OCR process. An English OCR package can deal very well with English, and may be able to cope passably with some other Roman alphabet languages such as French or German. However, it will not be very helpful in recognizing a document written in Chinese. In a large scale OCR operation, such as the Google Books Library Project, it can be less than desirable to rely on human intervention to select the appropriate OCR parameter configuration.

SUMMARY

This specification describes various aspects relating to leveraging the existing capabilities of an OCR engine to automatically identify OCR parameters best suited to a particular document (e.g., a book, a manuscript, or an eBook) based on initial scanning of sample pages from the document. These OCR parameters can include, e.g., language, character set, text orientation (e.g., portrait or landscape), text format (e.g., single or double column), text layout (e.g., inverse text, white on black), and the like.

In general, one aspect can be a method that includes using an optical character recognition (OCR) engine in a base configuration to generate one or more OCR responses corresponding to one or more sample pages of a document. The method also includes identifying a dominant OCR parameter for the document based on the one or more generated OCR responses. Other implementations of this aspect include corresponding systems, apparatus, and computer program products.

Another general aspect can be a system that includes a sampling module configured to obtain one or more sample pages of a document for OCR. The system can also include an OCR engine for performing a page-by-page OCR of the document. The system can further include means for configuring the OCR engine to automatically identify a dominant OCR parameter for the document. The system can additionally include a verification module configured to verify whether the OCR result for each page is consistent with the dominant OCR parameter of the document.

These and other general aspects can optionally include one or more of the following specific aspects. The method can further include obtaining the one or more sample pages of the document for OCR. For example, a multiple of equally spaced pages from the document (e.g., pages 3, 6, 9, 12, etc.) or even-numbered or odd numbered pages of the document can be obtained as sample pages. The spacing of the sample pages can be adjusted to ensure that there is sufficient number of pages for language identification.

The method can also include reconfiguring the OCR engine with a second configuration based on the dominant OCR parameter for the document, and performing a page-by-page OCR of the document using the second configuration. The method can further include comparing an OCR result for each page of the document with the dominant OCR parameter of the document. The method can additionally include determining, based on the comparing, whether the OCR result for each page is consistent with the dominant OCR parameter of the document.

The method can include generating a new OCR response of a page when the OCR result for the page is not consistent with the dominant OCR parameter of the document, and identifying a new dominant OCR parameter for the page based on the new OCR response. The method can also include reconfiguring the OCR engine with a third configuration based on the new dominant OCR parameter for the page, and performing an OCR of the page using the third configuration.

The OCR parameter can include, e.g., one or more of the following: language, character set, text orientation, text format, and text layout. The generation of one or more OCR responses can include scanning the one or more sample pages with the OCR engine, and training one or more classifiers corresponding to one or more OCR parameters. Each of the one or more classifiers can be associated with a unique response from the OCR engine. Additionally, the one or more classifiers can include, e.g., logistic regression classifiers.

The identification of the dominant OCR parameter can include obtaining a unique response from the OCR engine, and determining a classifier from the obtained unique response. The identification of the dominant OCR parameter can also include selecting the dominant OCR parameter from the one or more OCR parameters based on the classifier. The dominant OCR parameter of the document can be stored in a database.

Particular aspects can be implemented to realize one or more of the following advantages. OCR parameters for a document can be automatically determined without human intervention. Additionally, the determined OCR parameters can be used to configure the setting of an OCR engine so that, for example, the OCR accuracy can be improved. Further, the determined OCR parameters can be used to select the best OCR engine among several OCR engines (e.g., each OCR engine can specialize in a different script). In addition to printed text (e.g., text on paper), the automatic parameter identification functionality can also be applicable to electronic text images (e.g., image PDF of a document).

In one example, an OCR engine can be configured to automatically determine the language in which a document is written. The automatic identification of language can be useful for several purposes: (1) extract metadata about the document; (2) improve OCR accuracy for a document written in any given language by running OCR using the most appropriate lexicon/language pack; (3) improve document search by doing language restrict, or preferentially showing results that match the locale of the user; and (4) better analyze the textual information, for example, to automatically assess OCR quality, and to determine whether pages are overcropped during the OCR operation.

The general and specific aspects can be implemented using a system, method, or a computer program, or any combination of systems, methods, and computer programs. The details of one or more implementations are set forth in the accompanying drawings and the description below. Other features, aspects, and advantages will be apparent from the description, the drawings, and the claims.

DESCRIPTION OF DRAWINGS

These and other aspects will now be described in detail with reference to the following drawings.

Like reference symbols in the various drawings indicate like elements.

DETAILED DESCRIPTION

Figure 1:
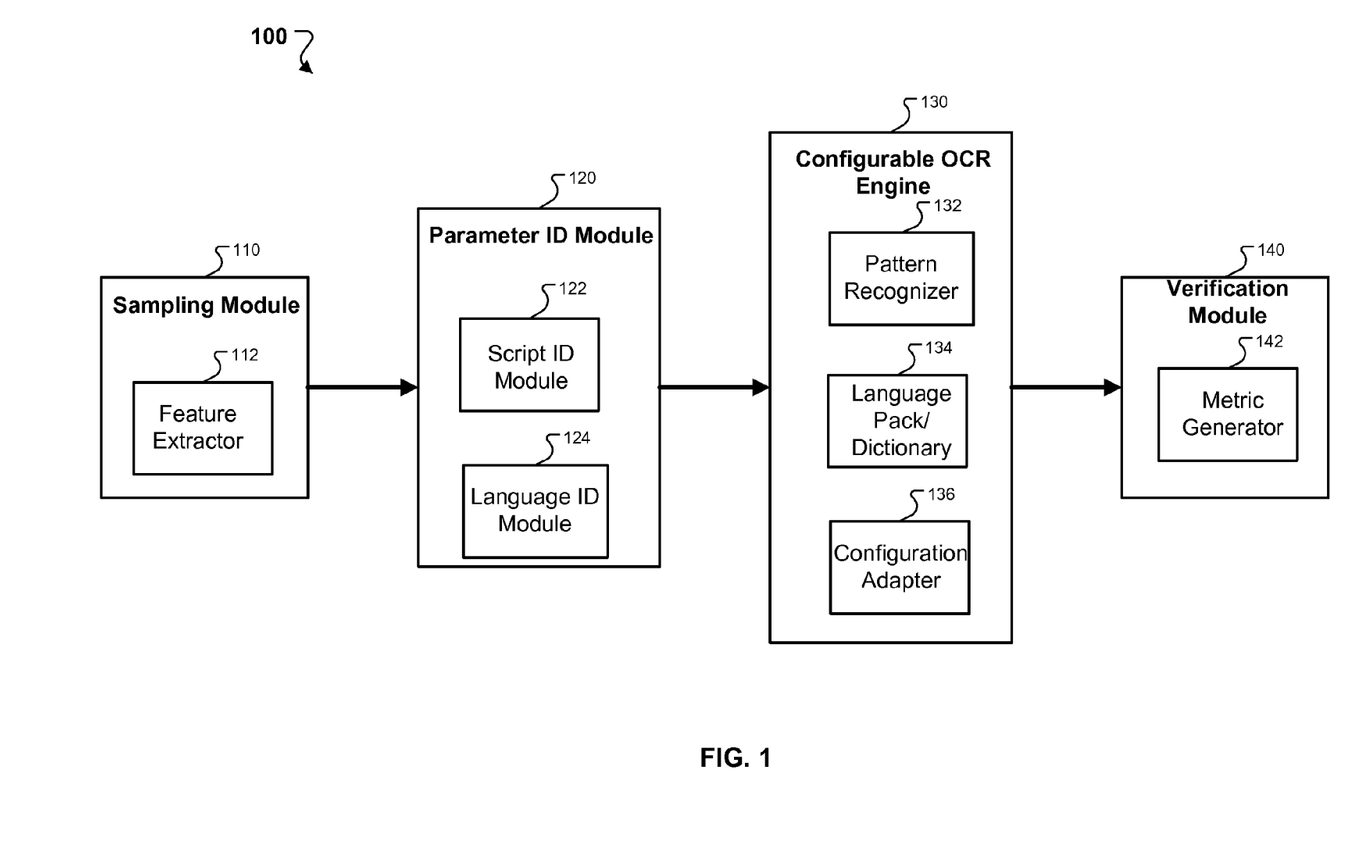
FIG. 1 is a schematic diagram of an integrated OCR system that can be configured to identify an unknown OCR parameter for a document.

FIG. 1 is a schematic diagram of an integrated OCR system 100 that can be configured to determine or identify an unknown OCR parameter for a document. As shown in FIG. 1, system 100 has a sampling module 110, which can, e.g., include a feature extractor 112 (e.g., an OCR engine with a basic configuration) that is capable of outputting OCR responses from a sample page of a document. As will be discussed in further detail below, sample pages of a document can be obtained by various ways. For example, the sample pages can be a multiple of evenly spaced pages of a document (e.g., pages 1, 5, 10, etc.).

The integrated OCR system 100 also includes a parameter identification (ID) module 120, which can, e.g., identify or determine relevant OCR parameters of a document. These OCR parameters may not be known prior to the OCR operation on the document. Additionally, these OCR parameters can include, e.g., language, character set, text orientation (e.g., portrait or landscape), text format (e.g., single or double column), text layout (e.g., inverse text, white on black), and the like. The parameter ID module 120 can include, e.g., a script ID module 122 for identifying the dominant script of a sample page, and a language ID module 124 for identifying the dominant language of a sample page. Details of the script ID module 122 and the language ID module 124 are discussed below.

System 100 further includes a configurable OCR engine 130, which can, e.g., be configured to convert printed text into electronic format. The configurable OCR engine 130 can include, e.g., a pattern recognizer 132 for recognizing patterns or shapes in a document. The configurable OCR engine 130 can also include, e.g., a language pack/dictionary module 134 for improving the OCR accuracy of an identified language. The configurable OCR engine 130 can further include, e.g., a configuration adapter 136 for reconfiguring the OCR parameters based on the parameter ID module 120. Thus, the OCR engine 130 can be configurable under a set of OCR parameters such as language, character set, dictionary, and the like.

The integrated OCR system 100 also includes a verification module 140, which can, e.g., verify whether the relevant OCR parameters of a document identified by the parameter ID module are accurate. For example, the verification module 140 can include a metric generator 142, which can generate a metric used by the verification module 140 to compare against the output of the OCR operation. As an example, the generated metric of the metric generator 142 can be number of recognized words or percentage of text-like area recognized.

The appropriate configuration for a normal OCR operation can be determined by the application context and initial manual tuning by a user. However, in large scale scanning operations that involve millions of books in many languages (for example, the Google Books Library Project), the relevant OCR parameters may not be easily determined. One time consuming and inefficient approach can be to exhaustively trying out a set of all possible OCR parameters on every scan. For example, suppose it is known that there can be 100 possible languages for the documents to be scanned in a large-scale OCR operation. The OCR engine can then be configured with 100 different language packs/dictionaries for the OCR operation. Thus, each page would need to be scanned with 100 different language settings and the language corresponding to the best output can be chosen to be the correct language for the page.

However, such a brute-force approach can be inefficient and unrealistic, if not impossible, for a very large scale OCR operation, such as the Google Books Library Project. In contrast, the integrated OCR system 100 provides an intelligent, integrated, and scalable sampling approach to determine relevant OCR parameters for the documents in a scanning operation. In general, the strategy used by the integrated OCR system 100 can involve starting with a base OCR configuration, recognize one or more sampled pages of a document, then fine tune the OCR configuration based on the sampling result. Thus, by leveraging the existing capabilities of an OCR engine, system 100 can identify the appropriate context by itself and reconfigure OCR parameters appropriately.

Figure 2A:
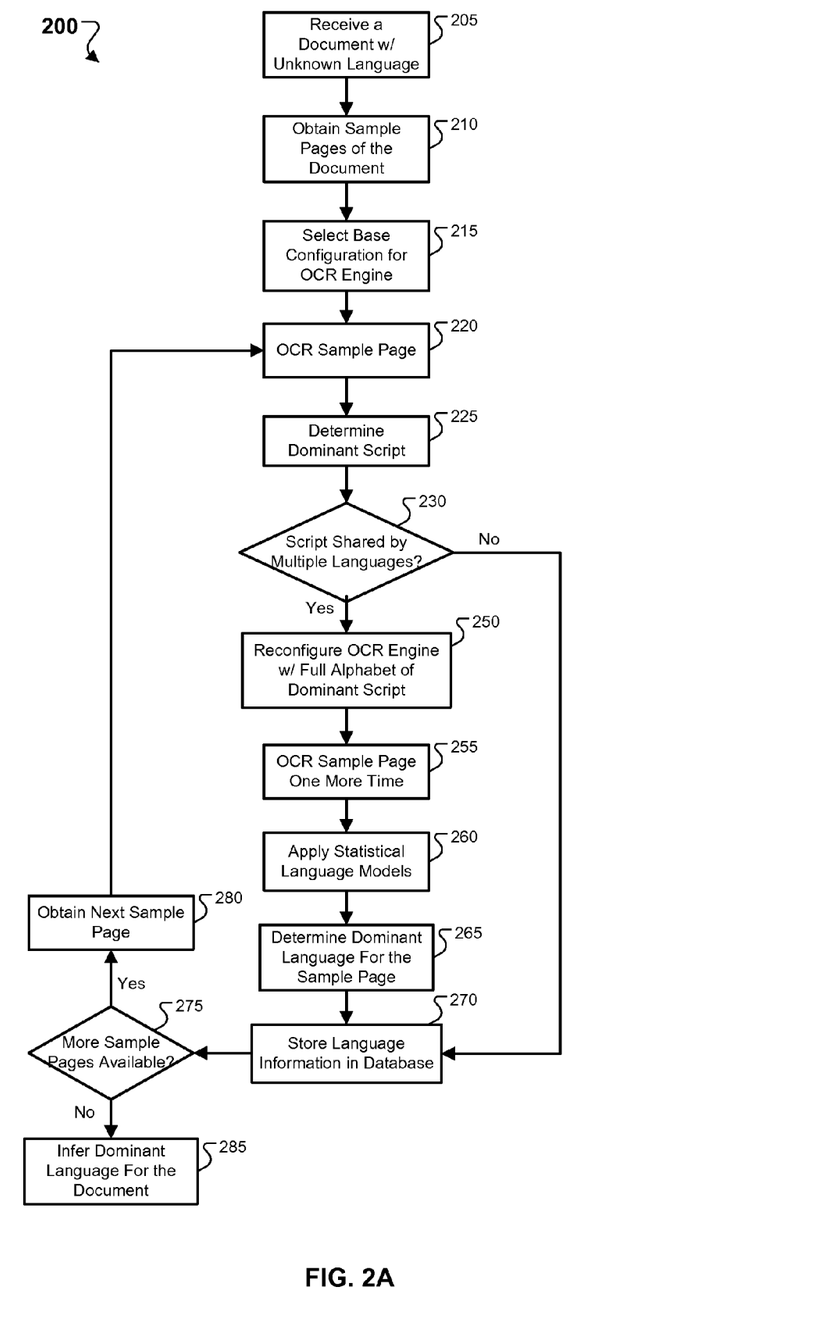
FIG. 2A is a flow chart illustrating a process of automatically determining the script and language of a document using the OCR engine.

FIG. 2 is a flow chart illustrating a process 200 of automatically determining the script and language of a document using the OCR engine, which can be, e.g., the configurable OCR engine 130 of FIG. 1. In general, process 200 can involve a two-stage hierarchy that combines shaped-based script ID in the first stage and statistical-based language ID in the second stage. An OCR engine can be used as a trained, configurable feature detector to provide a set of features, based on which machine learning technique can be used to learn a script classifier. After the script is identified, an approximate OCR can be applied with the full alphabet of the identified script to provide rough but sufficiently accurate recognition results for statistical-based language identification. Once the language is identified, a final round of fully configured OCR engine using the identified language can be applied. Details of the two stages involved in process 200 are described below.

At 205, process 200 receives a document with one or more languages that are unknown prior to the OCR operation. A document can contain one or more languages within its pages. At 210, process 200 obtains sample pages from the document, which, as noted above, can be done in various ways. For example, process 200 can select a multiple of equally spaced pages from the document (e.g., pages 3, 6, 9, 12, etc.) or even-numbered or odd numbered pages of the document. The spacing of the sample pages can be adjusted to ensure that there is sufficient number of pages for language identification, which is discussed in more detail below.

At 215, process 200 selects a base configuration for the OCR engine, which can be, for example, an all-purpose OCR engine that supports numerous scripts and their corresponding language packs/dictionaries. Additionally, A script can be defined as a unique family of writing system. For example, an OCR engine can support scripts such as the Latin (Roman) script, the Cyrillic script, the Greek script, the Chinese script, the Japanese script, and other scripts. Different languages can share the same script; for example, English, French, and Spanish all share the same Latin/Roman script. On the other hand, a language can include more than one script; for example, the Chinese language includes a traditional Chinese script and a simplified Chinese script. Thus, identification of a dominant script or language of a document can be difficult.

At 215, the OCR engine can be configured with a base configuration, which can be a set of representative symbols/alphabets from the supported scripts without specifying their corresponding language packs or dictionaries. In one implementation, a subset of the full alphabet for the Latin script and the Cyrillic script can be used in the base configuration of the OCR engine. In another implementation, the Latin script with its full alphabet (all 26 alphabets) and the Cyrillic script with a subset of its full alphabet can be used in the base configuration.

Once the base configuration of the OCR engine has been selected, at 220, process 200 performs an OCR operation on a sample page. For example, suppose that the base configuration of the OCR engine includes a subset of the full alphabet for the Latin script and the Cyrillic script. The OCR operation can scan the sample page with the Latin script and then the Cyrillic script, and produce an output response of the sample page from each of the Latin and Cyrillic scripts. In this manner, the OCR engine with the basic configuration can be used as a specialized feature extractor from which the dominant script of the sample page can be identified from its signal response to the OCR operation.

At 225, process 200 determines the dominant script of the sample page using the OCR engine as a general feature detector. By selecting an appropriate base configuration for the OCR engine, process 200 can induce sufficiently different and unique responses from the OCR operation for each target script. Further, each of the unique responses to the OCR operation can be statistically trained to correspond to a target script classifier. For example, a logistic regression classifier can be trained for each script.

As noted above, an example of such base configuration can be a subset of Latin, Cyrillic, or Chinese symbols/alphabets. The base configuration does not have to include symbols or alphabets from every script because OCR engines often interpret (albeit incorrectly) similarly shaped symbols in one script as characters in another script. For example, using the Latin script to scan a Chinese document, the OCR engine can confuse some Chinese characters as a Roman alphabet "m".

Thus, as long as the pattern of responses for each script is sufficiently different and consistent, a target script classifier can be trained to learn that pattern. The criterion for selecting the base configuration depends on the characteristic behavior of a specific OCR engine, involving a trade-off between the distinctiveness of the output response classes and the cost for computing those features. For example, the base configuration can be determined in ways similar to traditional feature selection, where the OCR engine with possible configurations are treated as the pool of possible features from which the best subset can be selected empirically.

For a given base configuration, various features, such as character unigrams, can be computed from OCR outputs on a set of training samples collected from each target script family. Additionally, since a general OCR engine can be used as a trained shape/pattern recognizer, there is no need to use conventional machine learning techniques (e.g., Language Identification From Image system proposed by the Los Alamos National Laboratory) to recognize symbol patterns and scan over text lines to find recognized symbols.

When the dominant script of the sample page has been determined, at 230, process 200 determines whether the dominant script is shared by multiple languages. For example, as described above, Latin script is shared by multiple languages. In one implementation, process 200 can consider Chinese/Japanese/Korean (CJK) as languages that all share the same set of "Han" symbol or script. If the dominant script is not shared by multiple languages, process 200 determine which language the dominant script belongs to and proceeds to store the language information in a database, at 270.

On the other hand, if the dominant script for the sample page is shared by multiple languages (e.g., Latin script), at 250, process 200 reconfigures the OCR engine with the full alphabet or symbol of the dominant script. In one implementation, reconfiguring can mean using the determined dominant script to select the best OCR engine among several OCR engines (e.g., each OCR engine can specialize in a different script). For example, there can have a generic Latin script OCR engine, an Arabic OCR engine, and an OCR engine for Chinese, Japanese and Korean. The reconfiguration at 250 can be used to determine which specific OCR engine to use, and what language pack to apply.

At 255, process 200 performs another OCR operation on the sample page using the full alphabets of the identified script. Once the output response of the sample page has been obtained, at 260, process 200 applies statistical language models to the output response of the sample page for determining the dominant language of the sample page.

While the first stage of process 200 leverages an OCR engine's shape recognition capability to identify the script, the results may not be sufficient to distinguish among languages that share the same alphabet. As noted above, different languages can share the same script; for example, English, French, and Spanish all share the same Latin/Roman script. The second stage of process 200 can be used to ensure the full alphabet within the script is adequately covered such that statistical language models can be applied to determine the language. For example, if only a subset of the Latin alphabet characters were used in the base configuration of the OCR engine, a full Latin-1 character set can be used in the second stage to help distinguish between western languages in the Latin script. Additionally, a full extended set of accented characters (e.g., umlauted characters for German) can be used; however, it is often not necessary to include the full extended set of accented characters.

In one implementation, n-gram or dictionary based language modeling techniques can be used to produce robust results so that the noise introduced by the restricted alphabet set can still be sufficient for language identification. For languages within the same script (mostly Latin/Roman script languages), OCR combined with n-gram statistics or short words (e.g., word unigram) can be effective in distinguishing the languages. For example, a large occurrence of the word "the" in a document can mean that the document is most likely written in English. On the other hand, a large occurrence of the words "le" or "la" in a document can mean that the document is most likely written in French.

This approach can be similar to web text language ID with noise. For example, a combination of 2-, 3- and 4-grams can be used to achieve close to perfect classification on sufficiently long texts. This method can be effective for identifying languages within an alphabetical script family, but may not work well on ideographical script or mixed script languages (e.g., Chinese). Additionally, given the small size of the Latin alphabet (low run time cost) and the high proportion of western languages expected for a large-scale OCR operation, the full set of Latin alphabet can be included in the base configuration so that both the script and language can be determined in one step for a large percentage of documents.

In another implementation, when mixed scripts are involved, a hierarchical classification of scripts can be applied. When mixed scripts and languages are involved, a hierarchical classification tree of scripts and language ID can be used. For example, for Asian scripts, specially designed features can be used for language identification. Additionally, special features and classifiers can be designed for languages that have a significant overlap in symbols, such as Chinese and Japanese, or languages within a family that have very different looking scripts, such as Indic scripts. The decision tree based approach can be effective for a small set of languages, but can require more design effort.

In a further implementation, as noted above, machine learning can be used to recognize symbol patterns and to scan over text lines to find recognized symbols. The machine learning method can be effective for script identification; however, it may not be as effective in distinguishing languages within a script family. For example, the symbol pattern at the character level between Spanish and Italian can be very similar. Thus, methods of using n-grams or word spotting may have to be used in combination with the machine learning method.

At 265, process 200 determines the dominant language for the sample page based on the results from the statistical language models. At 270, process 200 stores the dominant language information in a database, which can be useful, for example, for metadata extraction or online document search. At 275, process 200 determines whether more sample pages are available for OCR operation. If there are more sample pages, at 280, process 200 obtains the next sample page and the OCR operation is performed on the obtained sample page. In this manner, process 200 can perform OCR operation on all the sample pages and determined a dominant script and a dominant language for each sample page.

If, on the other hand, all the sample pages have gone through the OCR operation, at 285, process 200 can infer a dominant language for the document based on the language information stored in the database at 270. For example, suppose that 20 sample pages were obtained from a document that has a total of 200 pages, and that out of those 20 pages, 18 of the sample pages have a dominant language of English, and two of the sample pages have a dominant language of French. In one implementation, process 200 can infer that the document has a dominant language of English based on the majority of the sample pages. Additionally, the language information for the two sample pages with French can be stored so that during the OCR operation of the entire document, the appropriate language setting can be configured for these two pages.

Figure 2B:
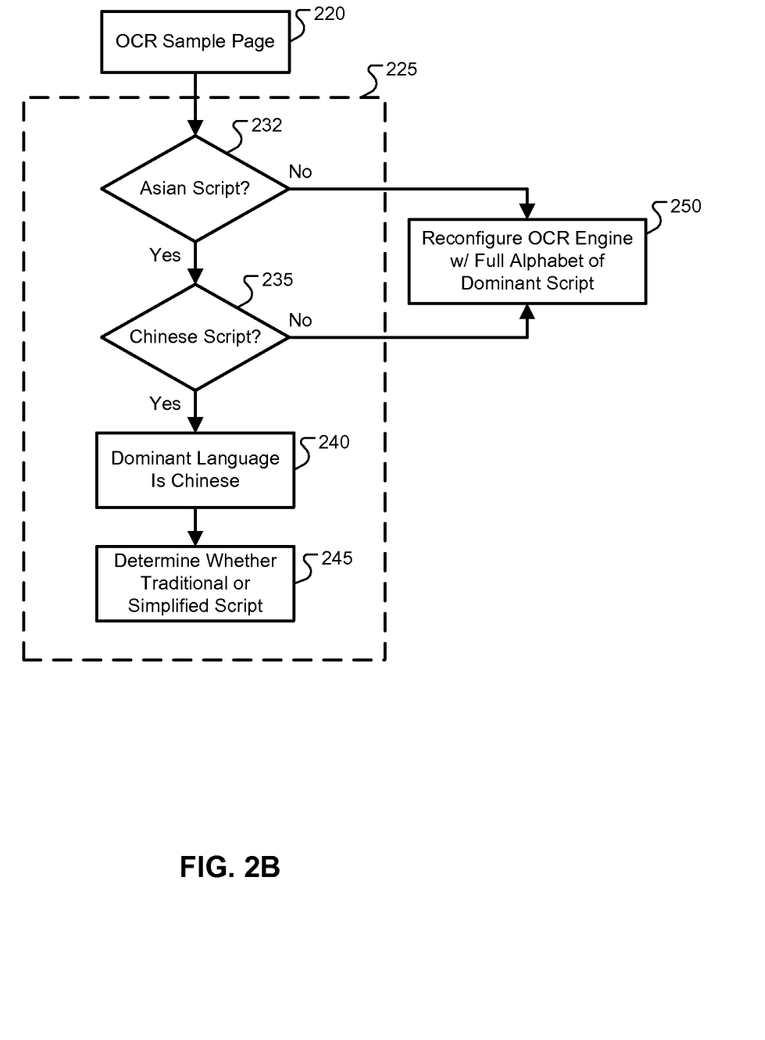
FIG. 2B is a flow chart illustrating one implementation of how the dominant script can be determined.

FIG. 2B is a flow chart illustrating one implementation of how the dominant script can be determined. At 232, process 200 determines whether the dominant script is Asian script, which can include, for example, the Chinese script, the Japanese script, and the Korean script, by comparing the OCR output with an Asian script classifier. If the dominant script is Asian script, at 235, process 200 further determines whether the Asian script is Chinese script. At this point, if the dominant script is Chinese script, at 240, process 200 can automatically identify that the dominant language for the sample page is Chinese. Additionally, at 245, process 200 can determine whether the Chinese language uses a traditional script or a simplified script. For example, as noted above, a separate script classifier for distinguishing between the traditional Chinese script and the simplified transcript can be used.

Figure 3:
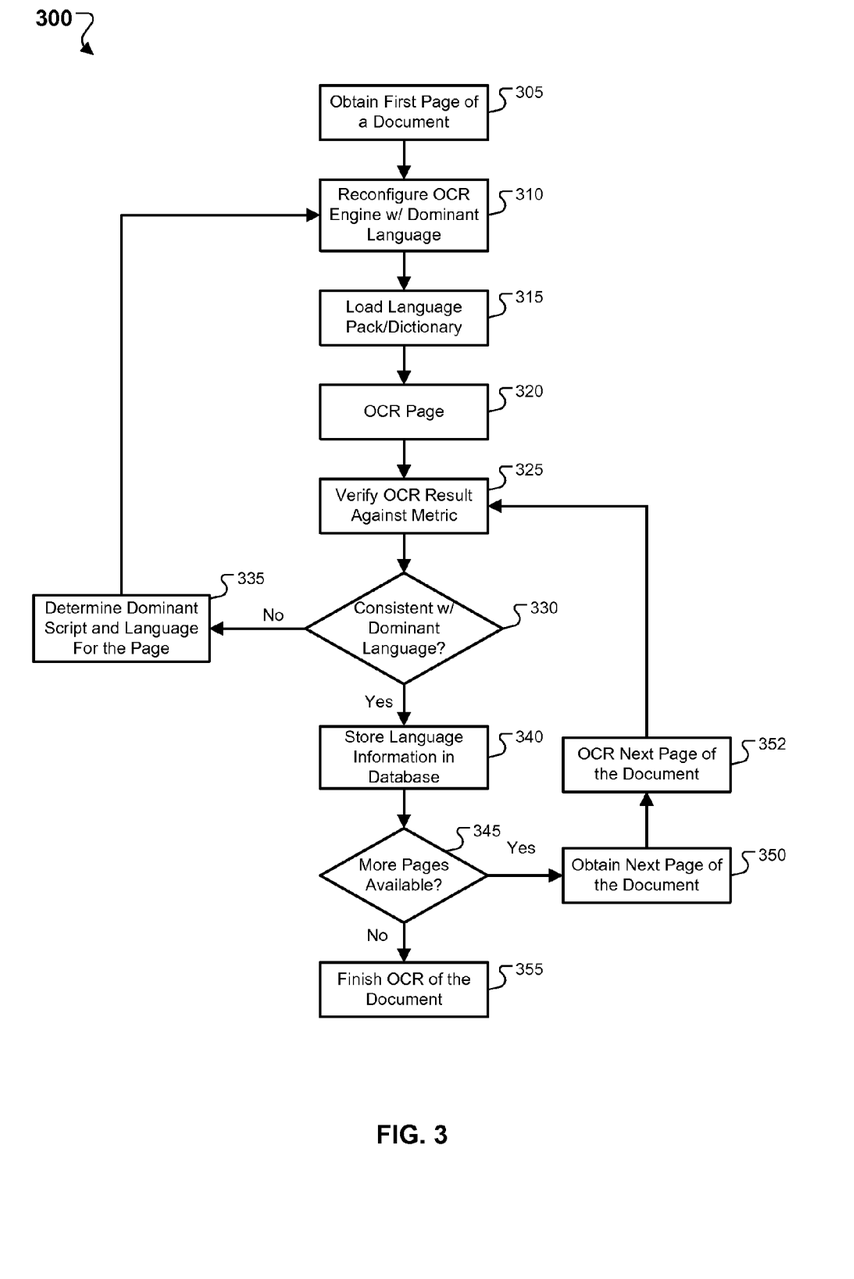
FIG. 3 is a flow chart illustrating a process of performing an OCR operation on a document with an unknown language.

FIG. 3 is a flow chart illustrating a process 300 of performing an OCR operation on a document with an unknown language. When processing a document scan, one can always apply the automated script and language ID with OCR (LID+OCR) mentioned above directly on each page. However, this can add a significant overhead to the overall process. The integrated OCR system takes advantage of the fact that most documents have a single dominant language and rely on a verification scheme to deal with pages that are in a different language.

First, the system samples a subset of the pages to go through the full LID+OCR process, from which the system can infer the dominant language by a majority count. Then the system performs OCR on all pages in the document with OCR configured for that language. As each page is scanned and recognized, the system checks the output against the statistical model for the presumed language. If the recognized text deviates significantly from the model, the system can apply the full LID+OCR process again. Details of this process is described below.

At 305, process 300 obtains the first page of a document. As described above, before performing the OCR operation on the entire document, sample pages can be scanned using the base configuration of the OCR engine. Based on the results of those sample pages, the dominant script for each of the sample pages can be determined. After identifying the script, the sample pages can be scanned again using the full alphabets for the identified script. Having the obtained recognition results of the script alphabet, statistical language identification can be performed to determine one or more dominant languages in those sample pages.

At 310, process 300 reconfigures the OCR engine with the identified dominant language of the document. At 315, process 300 loads the language pack/dictionary languages corresponding to the identified dominant language. At 320, process 300 performs the OCR operation on the first page of the document using be reconfigured setting for the OCR engine. As the page is scanned and recognized, a verification step checks if the results are consistent with the expected language. At 325, process 300 verifies the OCR result of the page by comparing against a metric.

Process 300, at 330, determines whether the OCR result is consistent with the identified dominant language. This can be done, for example, by using the statistical language models such as the n-gram method described above. Additionally, the metric can be, e.g., number of recognized words or percentage of text-like area recognized. In this manner, a threshold can be predetermined so that process 300 can reject the scanned page when there is a larger than expected discrepancy compared to the threshold.

At 335, when the language from the OCR result is not consistent with the previously identified dominant language, process 300 determines the dominant script and language for this page alone by using, e.g., process 200. Additionally, at 310, process 300 can reconfigure the OCR engine with the newly determined dominant language for this page. On the other hand, if there is no inconsistency between the OCR result and the dominant language, at 340, process 300 stores the language information for this page in a database. This language information can be useful, e.g., for improving electronic document search by using language restrict, or preferentially showing results that match the geographic location of the user.

At 345, process 300 determines whether there are more pages available in the document. If there are more pages, at 350, process 300 obtains the next page of the document. Additionally, at 352, process 300 performs an OCR operation on the next page of the document. The OCR result of this new page is then verified against the metric at 325. On the other hand, if there are no more pages available in the document to be scanned, process 300 finishes performing the OCR operation of the documents at 355.

In addition to what has been described above, the integrated OCR system and its corresponding methods can be applied to optimizing OCR parameters other than language, such as orientation, reverse video text, and the like. For example, documents that are written in landscape layout, inverse text (white-on-black), or single or double columns, can be considered as different classes to be determined by the OCR engine, just like the language. In this manner, the automatic identification of OCR parameters can avoid having to explicitly turning on checking all flags associated with OCR parameters, thereby degrading performance of the OCR engine.

For example, in determining an unknown OCR parameter other than the language, the sampling module can work the same way as that for the language identification. Additionally, the configuration adapter can change the values of these flags (just like it changes language settings). Instead of testing against a language model for discrepancy, the verifier module can generate a metric (e.g., number of recognized words, percentage of text-like area recognized, etc.) and reject the page when there is a larger than expected discrepancy to the norm.

Figure 4:
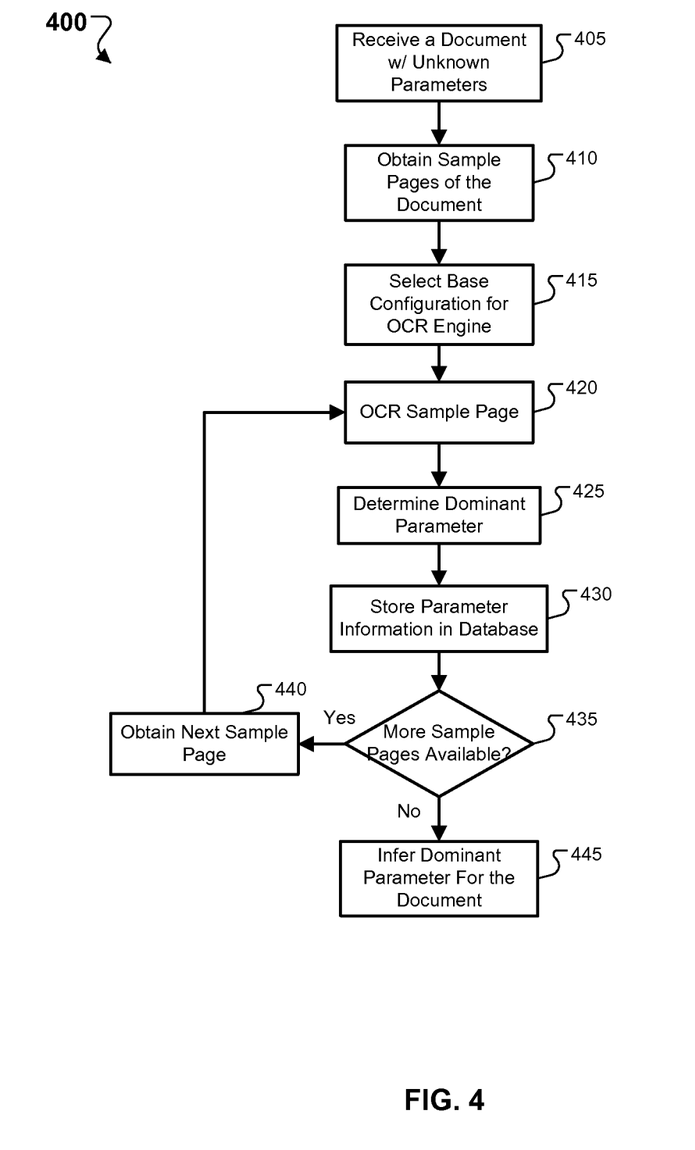
FIG. 4 is a flow chart illustrating a process of automatically determining OCR parameters of a document using the OCR engine.

FIG. 4 is a flow chart illustrating a process 400 of automatically determining OCR parameters of a document using the OCR engine. At 405, process 400 receives a document with one or more parameters that are unknown prior to the OCR operation. These OCR parameters can include, e.g., language, character set, text orientation (e.g., portrait or landscape), text format (e.g., single or double column), text layout (e.g., inverse text, white on black), and the like. At 410, process 400 obtains sample pages from the document, which, as noted above, can be done in various ways. For example, process 400 can select a multiple of equally spaced pages from the document (e.g., pages 3, 6, 9, 12, etc.) or even-numbered or odd numbered pages of the document.

At 415, process 400 selects a base configuration for the OCR engine, which can be, for example, an all-purpose OCR engine that supports numerous parameter settings. Once the base configuration of the OCR engine has been selected, at 420, process 400 performs an OCR operation on a sample page. For example, suppose that the base configuration of the OCR engine includes a setting for a landscape mode and a portrait mode. The OCR operation can scan the sample page with the landscape mode and then the portrait mode, and produce an output response of the sample page from each setting. In this manner, the OCR engine with the basic configuration can be used as a specialized feature extractor from which the dominant parameter of the sample page can be identified from its output response to the OCR operation.

At 425, process 400 determines the dominant parameter of the sample page using the OCR engine as a general feature detector. By selecting an appropriate base configuration for the OCR engine, process 400 can induce sufficiently different and unique responses from the OCR operation for each target parameter. Further, each of the unique response to the OCR operation can be statistically trained to correspond to a target parameter classifier. For example, a logistic regression classifier can be trained for each parameter.

At 430, process 400 stores the dominant parameter information in a database, which can be useful, for example, for metadata extraction or online document search. At 435, process 200 determines whether more sample pages are available for OCR operation. If there are more sample pages, at 440, process 200 obtains the next sample page and the OCR operation is performed on the obtained sample page. In this manner, process 400 can perform OCR operation on all the sample pages and determined a dominant parameter for each sample page.

If, on the other hand, all the sample pages have gone through the OCR operation, at 445, process 400 can infer a dominant parameter for the document based on the parameter information stored in the database at 430. For example, suppose that 20 sample pages were obtained from a document that has a total of 200 pages, and that out of those 20 pages, 18 of the sample pages have a dominant parameter of single-column text, and two of the sample pages have a dominant parameter of double-column text.

In one implementation, process 400 can infer that the document has a dominant parameter of single-column text based on the majority of the sample pages. Additionally, the parameter information for the two sample pages with double-column text format can be stored so that when the OCR operation is performed on the entire document, the appropriate parameter setting can be configured for these two pages.

In another implementation, process 400 can use an approach similar to the brute-force approach to determine the dominant OCR parameters for the sample pages. As an example, the landscape mode of a sample page can be +90 or −90 degrees. If process 400 gets nothing but O's (i.e., garbage) for the OCR output, it is likely that the page was scanned upside-down because the direction of the page was wrongly configured. This kind of degree or orientation patterns can be learned by a classifier. If the parameter value is binary, e.g., black-on-white or white-on-black text, once process 400 rules out one value, the other value can be selected.

However, process 400 can also explicitly test OCR outputs from both values and compare the two to see which is better, similar to the brute-force approach. In general, if the base configuration does not give any indication what the optimal value is, then process 400 can resort to such brute-force approach. Also, if the test for orientation does not give any information on whether the text is black-on-white or white-on-black, each parameter value have to be treated separately using the brute-force approach on just the sample pages.

Figure 5:
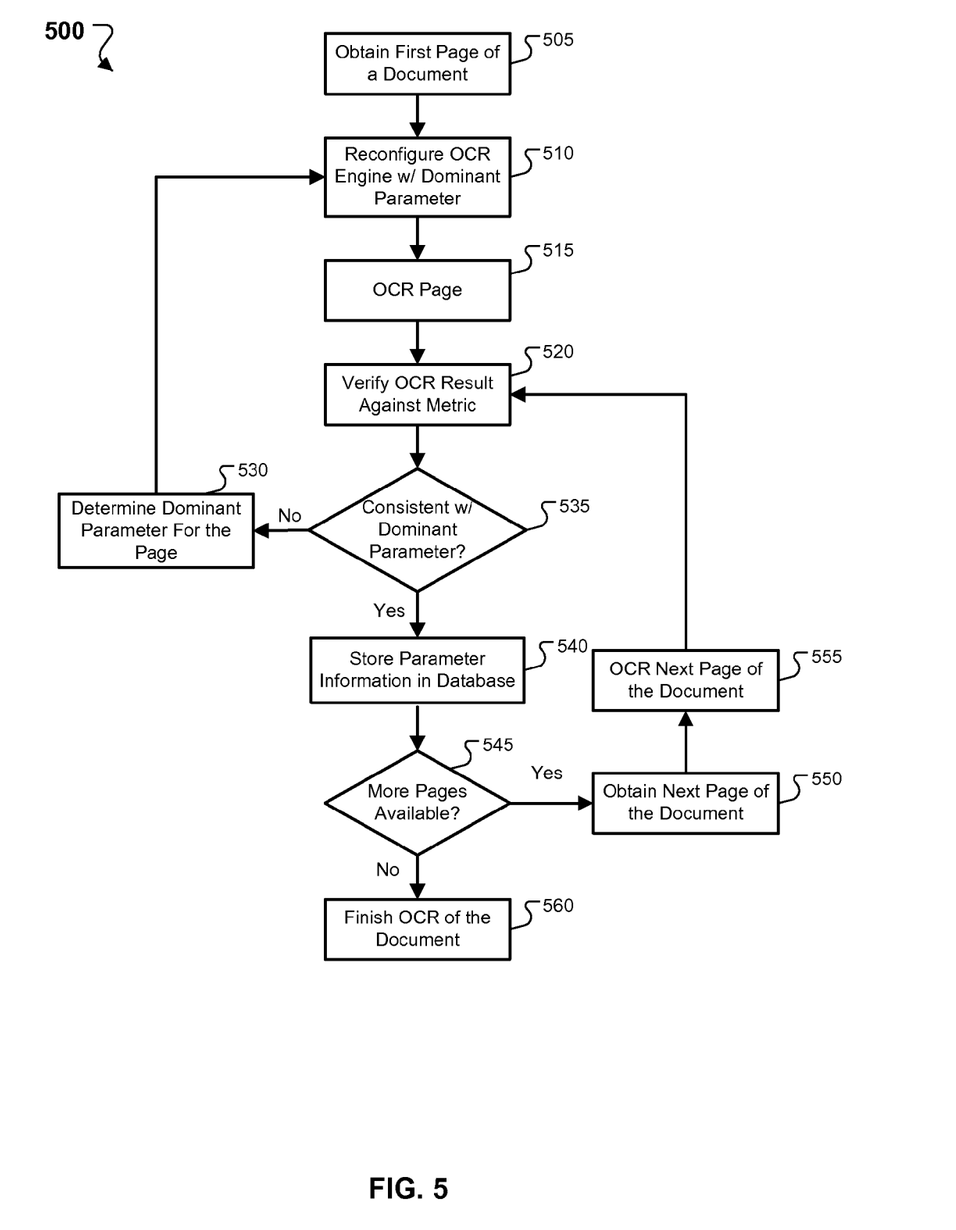
FIG. 5 is a flow chart illustrating a process of performing an OCR operation on a document with an unknown OCR parameter.

FIG. 5 is a flow chart illustrating a process 500 of performing an OCR operation on a document with an unknown OCR parameter. At 505, process 500 obtains the first page of a document. As described above, before performing the OCR operation on the entire document, sample pages can be scanned using the base configuration of the OCR engine. Based on the results of those sample pages, the dominant parameter for each of the sample pages can be determined. Additionally, a dominant parameter for the entire document can be inferred from the OCR results of the sample pages.

At 510, process 500 reconfigures the OCR engine with the identified dominant parameter of the document. At 515, process 500 performs the OCR operation on the first page of the document using be reconfigured setting for the OCR engine. As the page is scanned and recognized, a verification step checks if the results are consistent with the expected parameter determined, e.g., from process 400. At 520, process 500 verifies the OCR result of the page by comparing against a metric. Process 500, at 525, determines whether the OCR result is consistent with the identified dominant parameter. This can be done, for example, by using a metric, such as number of recognized words or percentage of text-like area recognized. In this manner, a threshold can be predetermined so that process 500 can reject the scanned page when there is a larger than expected discrepancy compared to the threshold.

At 530, when the parameter from the OCR result is not consistent with the previously identified dominant parameter, process 500 determines the dominant parameter for this page alone by using, e.g., process 400. Additionally, at 510, process 500 can reconfigure the OCR engine with the newly determined dominant parameter for this page, and a new OCR operation is performed on this page again. On the other hand, if there is no inconsistency between the OCR result and the dominant parameter, at 540, process 500 stores the parameter information for this page in a database.

In one implementation, the parameter information can be used for displaying the document correctly. For example, if the page is in landscape mode, using the parameter information, a system can turn it in the correct orientation when presenting it on the web. In another implementation, the parameter information can be used to monitor and detect the change of document styles. For example, book pages often do not just flip orientation randomly, or switch languages arbitrarily. Thus, the change often comes in large sections. If the system detected five French pages in a row within a predominantly English document, the system might consider switching to French, or English-French or all subsequent pages.

At 545, process 500 determines whether there are more pages available in the document. If there are more pages, at 550, process 500 obtains the next page of the document. Additionally, at 555, process 500 performs an OCR operation on the next page of the document. The OCR result of this new page is then verified against the metric at 525. On the other hand, if there are no more pages available in the document to be scanned, process 500 finishes the OCR operation of the documents at 560.

Figure 6:
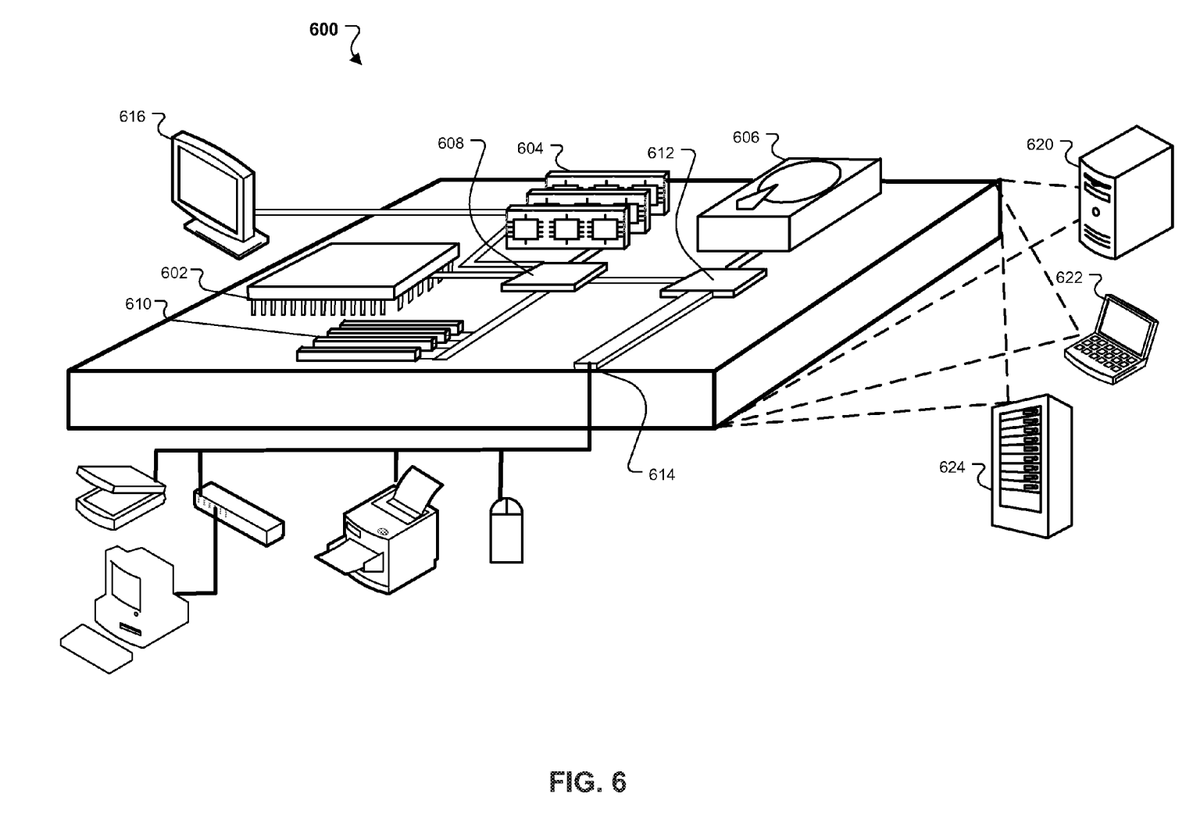
FIG. 6 is a block diagram of a computing device and system used to implement the integrated OCR system.

FIG. 6 is a block diagram of a computing device and system 600 that can be used, e.g., to implement the integrated OCR system 100. Computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers.

A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it is understood that various modifications can be made without departing from the spirit and scope of the described implementations. For example, the actions recited in the claims can be performed in a different order and still achieve desirable results. Additionally, variations of the sampling method can be implemented. For example, a different sampling strategy can involve selecting just one page at a time to quickly identify the language, and then relying on subsequent verification to detect pages that have different language. Further, a predictive algorithm can be used to make the best guess on the configuration while optimizing (minimizing) the number of redundant OCR operations.

In addition, the base configuration and the initial script configuration can be adjusted according to the expected distribution of languages for documents. For example, if English is expected to comprise 90% of the scanned documents, then English can be configured in the OCR engine to directly scan sample pages using English first, and switch to the more generic base configuration when the pages are determined to be non-English by the verification module. Accordingly, other implementations are within the scope of the following claims.

What is claimed is:

1. A computer-implemented method comprising:
performing a first optical character recognition process with an optical character recognition engine on one or more pages of a document to generate a first output response for each of multiple writing systems that each comprise a character set that is associated with one or more natural languages, wherein the first optical character recognition process uses a first configuration of the optical character recognition engine, and wherein, the first configuration of the optical character recognition engine configures the optical character recognition engine to recognize, for each of the writing systems, a limited subset of characters from the character set of the writing system;
using a trained classifier to identify, from among the multiple writing systems, a dominant writing system of the document based on the first output responses generated by the first optical character recognition process;
after identifying the dominant writing system of the document and before selecting a dominant natural language of the document, reconfiguring the optical character recognition engine from the first configuration to a second configuration that is different from the first configuration, wherein the second configuration of the optical character recognition engine configures the optical character recognition engine to recognize the full character set that is associated with the one or more natural languages associated with the dominant writing system of the document;
performing a second optical character recognition process with the reconfigured optical character recognition engine on one or more pages of the document to generate a second output response, wherein the second optical character recognition process uses the second configuration of the optical character recognition engine; and
selecting the dominant natural language from the one or more natural languages associated with the dominant writing system by applying one or more statistical language models to the second output response.

2. The method of claim 1, wherein the dominant writing system comprises one or more of the following: Latin script, Chinese script, Cyrillic script, Indic script, Japanese script, and Greek script.

3. The method of claim 1, wherein the trained classifier is a logistic regression classifier.

4. The method of claim 1, wherein identifying the dominant writing system of the document comprises:
- obtaining a unique response from the optical character recognition engine; and
- classifying the unique response using the trained classifier to identify the dominant writing system of the document.

5. The method of claim 1, wherein reconfiguring the optical character recognition engine from the first configuration to the second configuration comprises:
- selecting, from among one or more optical character recognition engines that are each associated with a writing system, a particular optical character recognition engine associated with the dominant writing system of the document; and
- reconfiguring the optical character recognition engine to use the particular optical character recognition engine associated with the dominant writing system of the document.

6. The method of claim 1, wherein performing the first optical character recognition process with the optical character recognition engine on one or more pages of the document to generate the multiple first output responses, and performing the second optical character recognition process with the reconfigured optical character recognition engine on one or more pages of the document to generate the second output response comprises:
- performing the first optical character recognition process and the second optical character recognition process on the same one or more pages of the document.

7. The method of claim 1, comprising:
- after selecting the dominant natural language, reconfiguring the optical character recognition engine from the second configuration to a third configuration that is different from the first configuration and the second configuration, wherein the third configuration of the optical character recognition engine is based at least in part on the selected dominant natural language; and
- performing a third optical character recognition process with the reconfigured optical character recognition engine on one or more pages of the document to generate a third output response, wherein the third optical character recognition process uses the third configuration of the optical character recognition engine.

8. The method of claim 7, comprising:
- determining that the generated third output response is not consistent with the selected dominant natural language based at least in part on recognized words of the generated third output response; and
- in response to determining that the generated third output response is not consistent with the selected dominant natural language, reconfiguring the optical character recognition engine to a fourth configuration that is different from the first configuration, the second configuration, and the third configuration, wherein the fourth configuration of the optical character recognition engine is based at least in part on a natural language that is different from the selected dominant natural language.

9. The method of claim 8, comprising performing a fourth optical character recognition process with the reconfigured optical character recognition engine on one or more pages of the document, wherein the fourth optical character recognition process uses the fourth configuration of the optical character recognition engine.

10. The method of claim 8, wherein determining that the generated third output response is not consistent with the selected dominant natural language is based at least partly on a number of recognized words of the generated third output response or a percentage of recognized text of the generated third output response.

11. The method of claim 1, wherein, using the second configuration of the optical character recognition engine, the optical character recognition engine is configured to recognize the full character set of the dominant writing system and is not configured to recognize the full character set of another writing system in the multiple writing systems.

12. The method of claim 1, wherein the one or more statistical language models includes an n-gram statistical language model.

13. A non-transitory computer-readable storage device having instructions stored thereon that, when executed by a computing device, cause the computing device to perform operations comprising:
- performing a first optical character recognition process with an optical character recognition engine on one or more pages of a document to generate a first output response for each of multiple writing systems that each comprise a character set that is associated with one or more natural languages, wherein the first optical character recognition process uses a first configuration of the optical character recognition engine, and wherein the first configuration of the optical character recognition engine configures the optical character recognition engine to recognize, for each of the writing systems, a limited subset of characters from the character set of the writing system;
- using a trained classifier to identify, from among the multiple writing systems, a dominant writing system of the document based on the first output responses generated by the first optical character recognition process;
- after identifying the dominant writing system of the document and before selecting a dominant natural language of the document, reconfiguring the optical character recognition engine from the first configuration to a second configuration that is different from the first configuration, wherein the second configuration of the optical character recognition engine configures the optical character recognition engine to recognize the full character set that is associated with the one or more natural languages associated with the dominant writing system of the document;
- performing a second optical character recognition process with the reconfigured optical character recognition engine on one or more pages of the document to generate a second output response, wherein the second optical character recognition process uses the second configuration of the optical character recognition engine; and
- selecting the dominant natural language from the one or more natural languages associated with the dominant writing system by applying one or more statistical language models to the second output response.

14. The storage device of claim 13, wherein the dominant writing system comprises one or more of the following: Latin script, Chinese script, Cyrillic script, Indic script, Japanese script, and Greek script.

15. The storage device of claim 13, wherein the trained classifier is a logistic regression classifier.

16. The storage device of claim 13, wherein identifying the dominant writing system of the document comprises:
- obtaining a unique response from the optical character recognition engine; and
- classifying the unique response using the trained classifier to identify the dominant writing system of the document.

17. The storage device of claim 13, wherein reconfiguring the optical character recognition engine from the first configuration to the second configuration comprises:
- selecting, from among one or more optical character recognition engines that are each associated with a writing system, a particular optical character recognition engine associated with the dominant writing system of the document; and
- reconfiguring the optical character recognition engine to use the particular optical character recognition engine associated with the dominant writing system of the document.

18. The storage device of claim 13, wherein performing the first optical character recognition process with the optical character recognition engine on one or more pages of the document to generate the multiple first output responses, and performing the second optical character recognition process with the reconfigured optical character recognition engine on one or more pages of the document to generate the second output response comprises:
- performing the first optical character recognition process and the second optical character recognition process on the same one or more pages of the document.

19. The storage device of claim 13, wherein the operations comprise:
- after selecting the dominant natural language, reconfiguring the optical character recognition engine from the second configuration to a third configuration that is different from the first configuration and the second configuration, wherein the third configuration of the optical character recognition engine is based at least in part on the selected dominant natural language; and
- performing a third optical character recognition process with the reconfigured optical character recognition engine on one or more pages of the document to generate a third output response, wherein the third optical character recognition process uses the third configuration of the optical character recognition engine.

20. The storage device of claim 19, wherein the operations further comprise:
- determining that the generated third output response is not consistent with the selected dominant natural language based at least in part on recognized words of the generated third output response; and
- in response to determining that the generated third output response is not consistent with the selected dominant natural language, reconfiguring the optical character recognition engine to a fourth configuration that is different from the first configuration, the second configuration, and the third configuration, wherein the fourth configuration of the optical character recognition engine is based at least in part on a natural language that is different from the selected dominant natural language.

21. The storage device of claim 20, wherein the operations comprise performing a fourth optical character recognition process with the reconfigured optical character recognition engine on one or more pages of the document, wherein the fourth optical character recognition process uses the fourth configuration of the optical character recognition engine.

22. The storage device of claim 20, wherein determining that the generated third output response is not consistent with the selected dominant natural language is based at least partly on a number of recognized words of the generated third output response or a percentage of recognized text of the generated third output response.

23. A system comprising:
- one or more data processing apparatus; and
- a computer-readable storage device having stored thereon instructions that, when executed by the one or more data processing apparatus, cause the one or more data processing apparatus to perform operations comprising:
  - performing a first optical character recognition process with an optical character recognition engine on one or more pages of a document to generate a first output response for each of multiple writing systems that each comprise a character set that is associated with one or more natural languages, wherein the first optical character recognition process uses a first configuration of the optical character recognition engine, and wherein the first optical character recognition configuration of the optical character recognition engine configures the optical character recognition engine to recognize, for each of the writing systems, a limited subset of characters from the character set of the writing system;
  - using a trained classifier to identify, from among the multiple writing systems, a dominant writing system of the document based on the first output responses generated by the first optical character recognition process;
  - after identifying the dominant writing system of the document and before selecting a dominant natural language of the document, reconfiguring the optical character recognition engine from the first configuration to a second configuration that is different from the first configuration, wherein the second configuration of the optical character recognition engine configures the optical character recognition engine to recognize the full character set that is associated with the one or more natural languages associated with the dominant writing system of the document;
  - performing a second optical character recognition process with the reconfigured optical character recognition engine on one or more pages of the document to generate a second output response, wherein the second optical character recognition process uses the second configuration of the optical character recognition engine; and
  - selecting the dominant natural language from the one or more natural languages associated with the dominant writing system by applying one or more statistical language models to the second output response.

24. The system of claim 23, wherein the dominant writing system comprises one or more of the following: Latin script, Chinese script, Cyrillic script, Indic script, Japanese script, and Greek script.

25. The system of claim 23, wherein the trained classifier is a logistic regression classifier.

26. The system of claim 23, wherein identifying the dominant writing system of the document comprises:
- obtaining a unique response from the optical character recognition engine; and
- classifying the unique response using the trained classifier to identify the dominant writing system of the document.

27. The system of claim 23, wherein reconfiguring the optical character recognition engine from the first configuration to the second configuration comprises:
- selecting, from among one or more optical character recognition engines that are each associated with a writing system, a particular optical character recognition engine associated with the dominant writing system of the document; and reconfiguring the optical character recognition engine to use the particular optical character recognition engine associated with the dominant writing system of the document.

28. The system of claim 23, wherein performing the first optical character recognition process with the optical character recognition engine on one or more pages of the document to generate the multiple first output responses, and performing the second optical character recognition process with the reconfigured optical character recognition engine on one or more pages of the document to generate the second output response comprises:

performing the first optical character recognition process and the second optical character recognition process on the same one or more pages of the document.

29. The system of claim 23, wherein the operations comprise:

after selecting the dominant natural language, reconfiguring the optical character recognition engine from the second configuration to a third configuration that is different from the first configuration and the second configuration, wherein the third configuration of the optical character recognition engine is based at least in part on the selected dominant natural language; and performing a third optical character recognition process with the reconfigured optical character recognition engine on one or more pages of the document to generate a third output response, wherein the third optical character recognition process uses the third configuration of the optical character recognition engine.

30. The system of claim 29, wherein the operations comprise:

determining that the generated third output response is not consistent with the selected dominant natural language based at least in part on recognized words of the generated third output response; and in response to determining that the generated third output response is not consistent with the selected dominant natural language, reconfiguring the optical character recognition engine to a fourth configuration that is different from the first configuration, the second configuration, and the third configuration, wherein the fourth configuration of the optical character recognition engine is based at least in part on a natural language that is different from the selected dominant natural language.

31. The system of claim 30, wherein the operations comprise performing a fourth optical character recognition process with the reconfigured optical character recognition engine on one or more pages of the document, wherein the fourth optical character recognition process uses the fourth configuration of the optical character recognition engine.

32. The system of claim 30, wherein determining that the generated third output response is not consistent with the selected dominant natural language is based at least partly on a number of recognized words of the generated third output response or a percentage of recognized text of the generated third output response.

* * * * *